United States Patent
Söderholm et al.

[11] Patent Number: 6,033,184
[45] Date of Patent: Mar. 7, 2000

[54] IMPELLER ARRANGEMENT IN A MEASURING DEVICE

[75] Inventors: Arne Söderholm; Olle Söderholm, both of Bromma, Sweden

[73] Assignee: S.E.G. Mekanik AB, Amal, Sweden

[21] Appl. No.: 09/021,937

[22] Filed: Feb. 11, 1998

[30] Foreign Application Priority Data

Feb. 11, 1997 [EP] European Pat. Off. ............ 97850021

[51] Int. Cl.[7] ......................................................... B63H 1/28
[52] U.S. Cl. .................................. 416/186 R; 416/223 R; 416/228; 416/237; 73/861.354; 73/861.79
[58] Field of Search ............................. 416/185, 186 R, 416/223 B, 235, 237, 228; 73/861.354, 861.73, 861.74, 861.75, 861.79

[56] References Cited

U.S. PATENT DOCUMENTS 2,877,649  3/1959  Powers ....................................... 73/194
3,224,079  12/1965  Dybvig ................................ 416/186 R

FOREIGN PATENT DOCUMENTS 0 146 902  7/1985  European Pat. Off. .
51995  4/1980  Japan ................................. 416/186 R

*Primary Examiner*—Edward K. Look
*Assistant Examiner*—Ninh Nguyen
*Attorney, Agent, or Firm*—Pillsbury Madison & Sutro LLP

[57] ABSTRACT

The invention relates to an impeller (1) for a mass flow measuring device receiving inflow of material through an inlet tube (6), the impeller comprising a bottom plate (4), an upper plate (5) and vanes (3) extending between the lower and upper plates. An inner edge (7) of the vanes (3) is continuously or successively rising from the center (9) of the impeller (1), or the vicinity thereof, towards the outer edge ($R_{1m}$) of the inlet tube (6), and that the vanes (3) are provided with a continuously or successively rising outer edge (14) corresponding to an increase of the radius of the impeller from the radius ($R_2$) of the bottom plate (4) to the radius ($R_{xm}$) of the upper plate (5).

9 Claims, 2 Drawing Sheets

IMPELLER ARRANGEMENT IN A MEASURING DEVICE

FIELD OF THE INVENTION

The present invention relates to an apparatus for measuring a mass flow, in particular bulk material or a fluid, and the invention especially relates to an impeller arrangement used in a measuring device in which the mass flow rate is measured by using the Coriolis measuring principle.

BACKGROUND OF THE INVENTION

Such a prior measuring device is known from our copending European patent application No. 96850202.1, filed on Nov. 29, 1996, describing the main principles for such a mass flow meter, and to which application herewith is referred.

In such a measuring device the particles to be measured are subjected to tangential acceleration in a whirling impeller, and the torque exerted on the vanes of the impeller in reaction to the Coriolis force of accelerated particles is being measured as an indication of the mass flow rate. The object of our above European patent application was to avoid measurement errors, due to uneven distribution of the material to be measured.

Even though the accuracy in the measurements has been greatly improved by our previous device, it is still subject to some errors if the distribution of the material can not be guaranteed. The errors depend on that the Coriolis force is reduced when the material is introduced in a position outside the center point of the impeller.

SUMMARY OF THE INVENTION

The object of the present invention is therefore to further improve the measurement accuracy of the material introduced into the impeller from the inlet tube by modifying the shape of the impeller.

The above object has been obtained in that the invention has been given the characterizing features stated in the appended claims.

BRIEF DESCRIPTION OF THE DRAWINGS

The invention will now be described with reference to the enclosed drawings, in which.

DETAILED DESCRIPTION OF THE INVENTION

Figure 1:
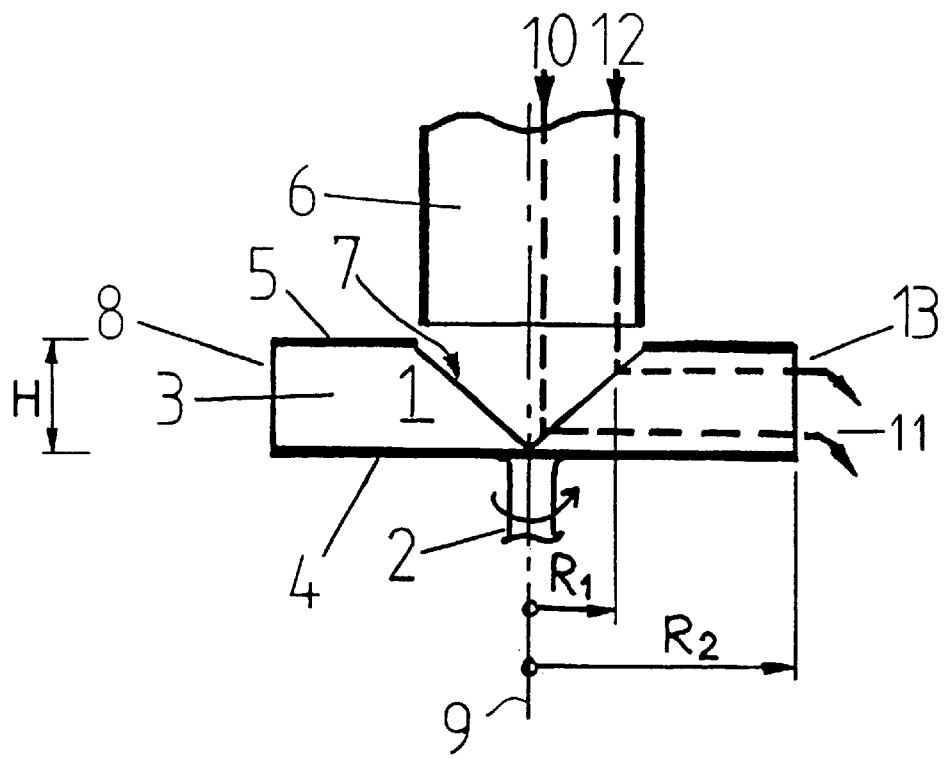
FIG. 1 shows a schematic side view of a conventional impeller and an inlet tube for a mass flow measuring device.

The part of the device shown in the drawings is intended to be a part of a complete device for measuring a mass flow of the kind described in our copending European patent application No. 96850202.1, but in these drawings is only shown the impeller 1. The other parts relating to the measuring device can have the same, but also alternative, designs as those shown in our previous application.

The impeller 1 is mounted for rotation around a vertical shaft 2, rotating in a direction shown by the arrow. The impeller 1 is provided with vanes 3 leading to the circumferential edge of the impeller 1, for guiding the material to be measured from the central area out from the impeller 1 via the vanes 3. The bottom of the impeller 1 is closed by a lower plate 4, and the top of the impeller 1 is closed by an upper plate 5, having a central opening above which the end of an inlet tube 6, supplying the material to be measured, ends.

The present invention involves another way to solve the problem of minimizing the measurement errors referred to above. The distribution of the inflowing material into the measuring device can with the present invention be arbitrary or improved by any of the devices defined in any other of our European patent applications filed simultaneously herewith. According to the invention the measurement errors can be minimized if the size of outer radius $R_2$ of the impeller 1 used for the measurement is varied. The impeller vanes 3 are assumed to have a height H increasing from the center of the impeller 1 until reaching the radius of the tube 6 leading the material into the impeller 1.

Material particles entering the measuring device are falling down in the central part of the impeller 1 and rebounding from the center and due to the centrifugal force the particles are thrown substantially horizontally along any of the impeller vanes 3 towards the outer diameter $R_2$ of the impeller 1. The particles leave the impeller at its lower edge, which has a certain outer radius. Material particles that are entering the impeller 1 close to wall of the inlet tube 6 are thrown towards the upper edge of an impeller vane and are also deflected horizontally. The diameter of the impeller can in relation to the lower edge have a larger radius at its upper part. The increased radius gives rise to an extra acceleration distance compensating for that the radial point of impact results in a shorter distance than that from the impeller center.

The desired degree of compensation can be calculated according to the equation as described in our earlier European patent application No. 96850202.1, namely the mass flow $q=M/n(R_2^2-R_1^2)$ where M=torque, n=axis speed of rotation, $R_2$=outer radius of the impeller, and $R_1$=inner radius from which the particles or the flow meet the impeller surface in or round it's centre. A closer analysis has shown that if you take into consideration the impact from the incoming material the equation will be:

$$q=M/n*[R_2^{2}-(R_1/2)^2]$$

If $R_1=0$ the outer diameter is $R_2$, whereas material having a point of impact outside the center of the impeller hitting the impeller at a distance x from the center will have the radius $R_{1x}$, and the corresponding outer radius $R_x$, the equation if q, M and n are regarded as constants, will be $$R_2^2=R_x^2-(R_{1x}/2)^2$$

and consequently $$R_x=[(R_2^2+(R_{1x}/2)^2]^{1/2}$$

The radius $R_x$ at the upper edge of the impeller is $R_{xMax}$, and $R_{1x}=R_{1Max}$=the radius of the incoming inlet tube.

If the impeller vanes are made with varying outer diameter following the equation above, the influence of different point of impact for the incoming particles is eliminated.

As it is desirable to have the speed of the material particles limited so that they are not crushed when they hit the surface they meet when they leave the impeller, the diameter of the impeller should be kept constant irrespective of the magnitude of the material flow. The diameter of the incoming tube is increasing with increasing maximum flow, and consequently the vanes 3 extend along a shorter part of the impeller radius, but at the same time the height H of the vanes 3 increase.

In FIG. 1 is as stated above shown the conditions in an ordinary impeller in which the outer diameter $R_2$ for all heights of the impeller is constant, and parallel with the shaft 2. The inner edge of the impeller vanes 3 is successively increasing from the center of the impeller to the inner radius of the inlet tube 6. The outer edge 8 of the vanes is as stated above parallel with the shaft 2 and the center line 9, around which the impeller 1 rotates. By the line 10 is shown a flow line for a particle entering the measuring device close to the center of the inlet tube 6, and falling into the impeller near its center, from which the same particle will follow the line 11 close to the bottom 4 along a vane 3 when passing out to the circumferential edge of the impeller. Correspondingly is by the line 12 shown a flow line for a particle entering the measuring device close to the wall of the inlet tube 6, and falling into the impeller off its center, from which the same particle will follow the line 13 close to the top 5 along a vane 3 when passing out to the circumferential edge of the impeller. It is quite obvious that the shorter distance $(R_2-R_1)$ the particle following line 13 is in contact with the vane 3 will lead to another force on the vane than a particle following the line 11.

Figure 2:
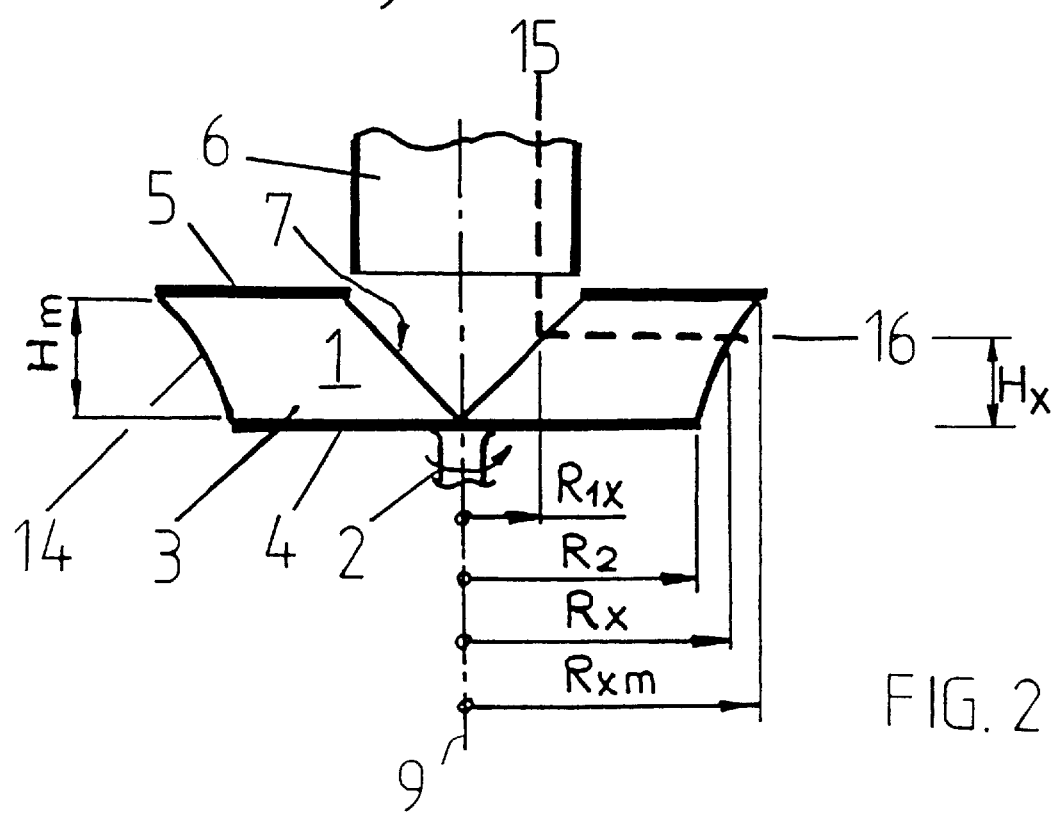
FIG. 2 shows schematically a side view corresponding to FIG. 1 but with an impeller according to the invention.

In FIG. 2 is shown a view similar to the one in FIG. 1, but the impeller is in this case made in accordance with the present invention, and consequently the outer diameter of the impeller 1 increases from $R_2$ at the bottom to $R_{xm}$ at the top of the vanes 3. Correspondingly the outer edge 14 of the vanes 3 continuously or successively increases from the bottom 4 to the top 5. By 15 is shown the flow line for a particle entering the flow measuring device at a distance $R_{1x}$ from the center line 9 of the impeller 1, and horizontally follows the flow line 16 for escaping the impeller at a distance $R_{xm}$ from the center line 9.

Figure 3:
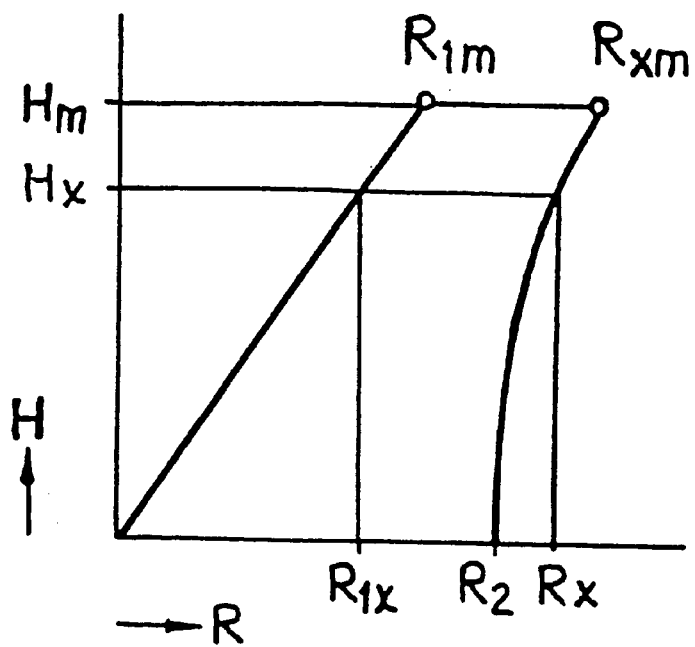
FIG. 3 shows a diagram showing the relation between height H and radius R of the impeller.

FIG. 3 shows a diagram H=f(R) showing the relation between the height $H_x$ and the outer radius $R_x$ for the impeller vanes 3, with the limits $0<H<H_m$ and $R_2<R_x<R_{xm}$. The enclosed area corresponds to the profile the vane 3 should have to eliminate the influence of different point of impact for the incoming particles.

Figure 4:
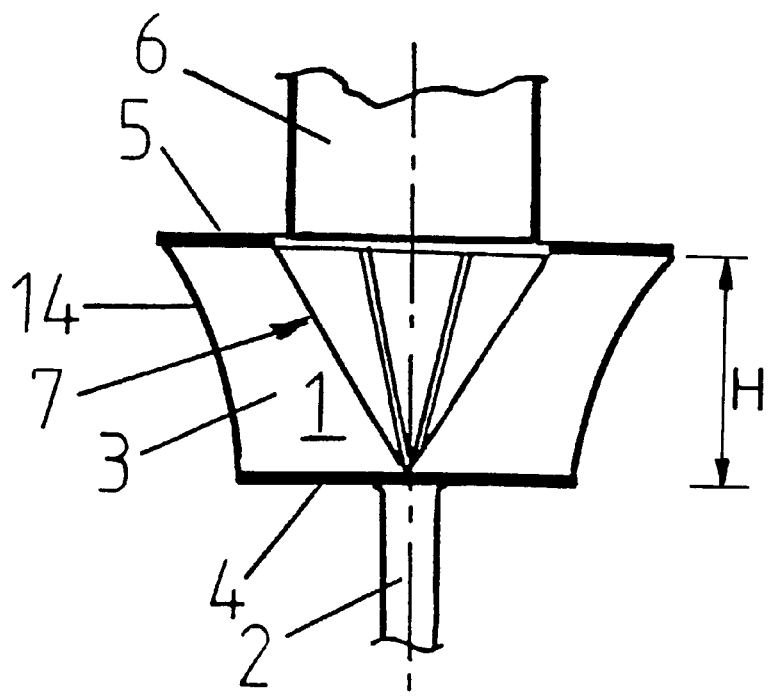
FIG. 4 shows schematically a side view of an impeller according to the invention and made for a large material flow.

In FIG. 4 is shown the proper form of the impeller for a large material flow. The inlet tube 6 has a large radius in relation to the radius of the upper plate 5. The height H of the impeller 1 is increased in relation to the impeller radius, whereby the vanes become proportionately shorter. The inner radius $R_1$ the becomes more important, but the influence is eliminated in that the outer edge 14 has an increasing radius. By this impeller there is no need for any disturbing inserts in the inlet tube, which is important for large material flows.

With an impeller formed according to the present invention it will be possible to make n impeller having a big height and no area reducing device in the inlet, and nevertheless minimize the influence of an uneven distribution of the incoming flow of material.

I claim:

1. In a mass flow measuring device, an impeller for receiving an inflow of material through an inlet tube, the impeller comprising:
   a bottom plate,
   an upper plate, and
   vanes extending between the bottom and upper plates,
   wherein an inner edge of the vanes is continuously or successively rising from the center of the impeller, or the vicinity thereof, towards the outer edge $(R_{1m})$ of the inlet tube, and wherein the vanes are provided with a continuously or successively rising outer edge corresponding to an increase of the radius of the impeller from the radius $(R_2)$ of the bottom plate to the radius $(R_{xm})$ of the upper plate.

2. In a mass flow measuring device an impeller according to claim 1, wherein the inner edge of the vanes is rising linearly from the center of the impeller, or the vicinity thereof, towards the outer edge $(R_{1m})$ of the inlet tube.

3. In a mass flow measuring device an impeller according to claim 1, wherein the outer edge of the vanes follows a mathematically calculated curve for minimizing measurement errors, and that the increase of outer radius of the vanes corresponds to the increase of the radius of the impeller from the radius $(R_2)$ of the bottom plate to the radius $(R_{xm})$ of the upper plate.

4. In a mass flow measuring device an impeller according to claim 3, wherein the outer edge of the vanes follows an approximate value to the mathematically calculated curve.

5. In a mass flow measuring device an impeller according to claim 1, wherein the outer edge of the vanes rises linearly corresponding to the increase of the radius of the impeller from the radius $(R_2)$ of the bottom plate to the radius $(R_{xm})$ of the upper plate.

6. In a mass flow measuring device an impeller according to claim 2, wherein the outer edge of the vanes follows a mathematically calculated curve for minimizing measurement errors, and that the increase of outer radius of the vanes corresponds to the increase of the radius of the impeller from the radius $(R_2)$ of the bottom plate to the radius (Rxm) of the upper plate.

7. In a mass flow measuring device an impeller according to claim 6, wherein the outer edge of the vanes follows a approximate value to the mathematically calculated curve.

8. In a mass flow measuring device an impeller according to claim 2, wherein the outer edge of the vanes rises linearly corresponding to the increase of the radius of the impeller from the radius $(R_2)$ of the bottom plate to the radius $(R_{xm})$ of the upper plate.

9. In a mass flow measuring device having an inlet tube through which an inflow of material is received during a mass flow measuring operation, an impeller comprising:
   a first plate having an opening formed therethrough;
   a second plate spaced apart from said first plate; and
   a plurality of vanes extending between said first and second plates, said vanes having inner edges at inner radial ends thereof and outer edges at outer radials ends thereof;
   said inner edges being sloped from said second plate to said first plate in a radially outward direction of said impeller;
   said outer edges being sloped from said second plate to said first plate in the radially outward direction of said impeller;
   said impeller being positioned in said device with the opening in said first plate facing said inlet tube so that material flowing in through said inlet tube flows into said impeller.

* * * * *